United States Patent [19]

Chen

[11] Patent Number: 5,200,503

[45] Date of Patent: Apr. 6, 1993

[54] STABILIZERS FOR HALOPOLYMER COMPOSITIONS

[75] Inventor: Chii-Shu Chen, Parsippany, N.J.

[73] Assignee: Ausimont, U.S.A., Inc., Morristown, N.J.

[21] Appl. No.: 868,636

[22] Filed: Apr. 15, 1992

[51] Int. Cl.$^5$ .................. C08K 3/3492; C08K 5/36; C08K 5/524

[52] U.S. Cl. .................. 524/81; 524/100; 524/147; 524/151; 524/152; 524/153; 524/302; 524/303; 524/424; 524/436

[58] Field of Search ................. 524/81, 100, 147, 151, 524/152, 153, 302, 303, 429, 436

[56] References Cited

U.S. PATENT DOCUMENTS

| | | | |
|---|---|---|---|
| 3,707,542 | 12/1972 | Steinberg et al. | 524/100 |
| 3,773,698 | 11/1973 | Khattab | 529/305 |
| 4,349,468 | 9/1982 | Nakahara et al. | 524/302 |
| 4,444,929 | 4/1987 | Chaser | 524/101 |
| 4,707,509 | 1/1987 | Fisch et al. | 524/147 |

FOREIGN PATENT DOCUMENTS 0330256  8/1989  European Pat. Off. .

*Primary Examiner*—Kriellion S. Morgan
*Attorney, Agent, or Firm*—John G. Gilfillan, II; Raymond J. Lillie

[57] ABSTRACT

A composition comprising an ethylene/chlorotrifluoroethylene copolymer and an effective stabilizing amount of a phenolic complex of the formula:

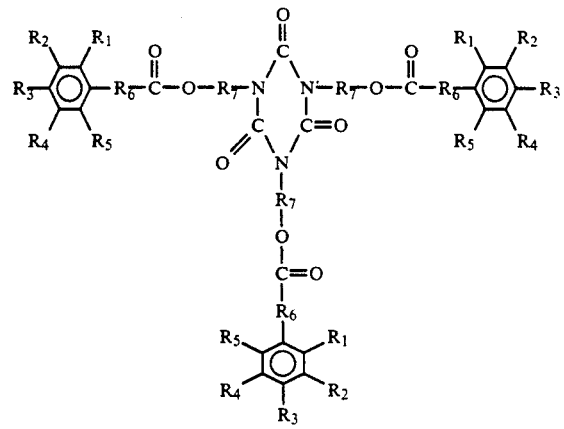

wherein at least one of $R_1$, $R_2$, $R_3$, $R_4$, and $R_5$ is —OH, and wherein the remaining $R_1$ through $R_5$ is hydrogen or an aliphatic hydrocarbon, and wherein each of $R_1$ through $R_5$ may be the same or different provided that at least one of $R_1$ through $R_5$ is —OH, and each of $R_6$ and $R_7$ is an alkylene group having from 1 to about 10 carbon atoms, and each of $R_6$ and $R_7$ may be the same or different. The composition may further include a phosphite, a thioester or sulfide compound, and/or an inorganic filler such as tricalcium aluminate hexahydrate. Such compositions show improved melt stability at high temperatures and are useful as wire and cable coatings, films, and pipes.

59 Claims, No Drawings

STABILIZERS FOR HALOPOLYMER COMPOSITIONS

This application is a continuation-in-part of application Ser. No. 826,240, filed Jan. 27, 1992 abandoned which is a continuation of application Ser. No. 727,311, filed Jul. 1, 1991, abandoned, which is a continuation of application Ser. No. 464,973, filed Jan. 16, 1990, abandoned.

This invention relates to halopolymers, in particular fluoropolymers, and stabilizers therefor. More particularly, this invention relates to improved stabilized ethylene/chlorotrifluoroethylene copolymers having improved color, melt stability, and less weight loss during processing at high temperatures.

Ethylene/chlorotrifluoroethylene copolymers exhibit outstanding mechanical, electrical and chemical properties at high temperatures. For example, ethylene/chlorotrifluoroethylene copolymers resist attack of most organic solvents at ambient as well as elevated temperatures, being only slightly soluble at 100°–150° C. in a 2,5 dichlorobenzotrifluoride/benzonitrile or o-dichlorobenzene mixtures of 10:90 to 50:50 volume ratio. They are insoluble in bases and acids, including fuming nitric acid. These copolymers also possess high tensile strength and have melting points above about 200° C. and as high as about 260° C., which melting points are higher than those of the homopolymers of either ethylene (as high as 130° C.) or chlorotrifluoroethylene (as high as 215° C.). Equimolar ethylene/chlorotrifluoroethylene copolymers also have outstanding electrical properties. For all of these advantageous properties, they are suitable for making useful articles, such as valves, gaskets, pipes, wire insulation, sheets or films for use in applications where their excellent mechanical, electrical and chemical properties can be used to advantage.

Ethylene/chlorotrifluoroethylene copolymers, due to their high melting points in excess about 220° C., require melt fabrication temperatures of above about 250° C., usually within the range of between about 260° C. to 310° C. At these high temperatures, an initial bubble formation and degradation of the polymer occurs, resulting in loss of chemical, mechanical and electrical properties. In particular, loss of these properties occurs during extrusion wire coating causing high scrap rates for the process.

U.S. Pat. Nos. 3,745,145; 3,773,698 and 4,539,354 disclose various ethylene/chlorotrifluoroethylene copolymer compositions which are stabilized against thermal degradation. Generally used thermal stabilizing systems for these copolymers comprise a phosphite of an organic polyhydric phenol; a salt of a carboxylic acid and a metal of Group II of the periodic table; and a thiodipropionic acid ester or alkali metal salt. This stabilizing system is satisfactory for most melt fabricating techniques used to process ethylene/chlorotrifluoroethylene copolymer compositions. However, there are various melt fabricating processes, such as high speed extrusion coating of conductors for telephone wire, where the temperature, residence time and shearing of the material in the process are more severe than encountered in most melt fabricating techniques. A particular problem in such a process is the formation of bubbles in the molten polymer. Each bubble is believed to cause spark failures, cone breaks, reduced mechanical properties and other processing and quality problems. Therefore, it is desirable to have an improved stabilization system for ethylene/chlorotrifluoroethylene compositions to protect against bubble formation during high speed extrusion.

In accordance with an aspect of the present invention, there is provided a composition comprising an ethylene/chlorotrifluoroethylene copolymer and an effective stabilizing amount of (a) a phenolic complex having the formula:

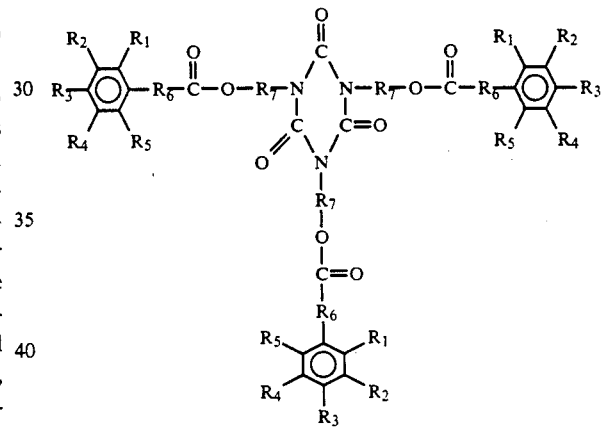

wherein at least one of $R_1$ through $R_5$ is —OH, and the remaining $R_1$ through $R_5$ is hydrogen or an aliphatic hydrocarbon, and wherein each of $R_1$ through $R_5$ may be the same or different provided that at least one of $R_1$ through $R_5$ is —OH. Each of $R_6$ and $R_7$ is an alkylene group having from 1 to about 10 carbon atoms, and each of $R_6$ and $R_7$ may be the same or different; and (b) a phosphite of the formula $P-(OR)_3$, wherein R is hydrogen or an alkyl, cycloalkyl, aralkyl, aryl, or a hydroxysubstituted alkyl group having from 1 to 18 carbon atoms.

In accordance with one embodiment, the aliphatic hydrocarbon is a saturated hydrocarbon, and preferably having from 1 to 5 carbon atoms. More preferably, at least one of the remaining $R_1$ through $R_5$ is a tert-butyl group. Still more preferably, each of $R_6$ and $R_7$ is an alkylene group having from 1 to 5 carbon atoms.

In a most preferred embodiment, the phenolic complex is of the formula:

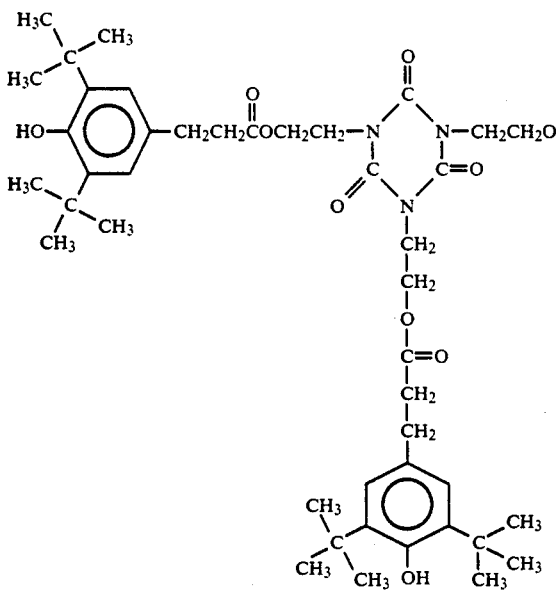

This compound is known as 3,5,di-t-butyl-4-hydroxy hydrocinnamic acid triester of 1,3,5-tris (2-hydroxy ethyl)-s-triazine 2,4,5-(1H, 3H, 5H)-trione. An example of this phenolic complex is sold by the R. T. Vanderbilt Company as Vanox SKT. This compound has a molecular weight of 1,042, and is in the form of a whit crystalline powder, and has a density of 0.92 Mg/m³±0.03 and has a melting range of 123°–131° C.

Preferably, the phosphite is of the formula P-(OR)₃, wherein R is of the formula:

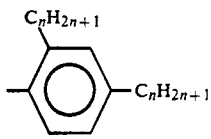

wherein n is from 1 to about 9. Most preferably, the phosphite is tris (2,4-di-tert-butyl-phenyl) phosphite, which is of the following structure:

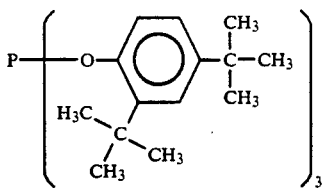

Tris (2,4-di-tert-butyl-phenyl) phosphite has a molecular weight of 647 and a melting point of 185° C., and is normally in the form of white powder.

The phenolic complex may be present in an amount of from about 0.02 to about 5 parts per one hundred parts of the ethylene/chlorotrifluoroethylene copolymer in the composition, preferably from about 0.15 to about 0.6 parts per hundred, and most preferably from about 0.3 to about 0.6 parts per hundred.

The phosphite, when present, may be present in an amount of from about 0.02 to about 5.0 parts per one hundred parts of halopolymer in the composition, preferably from about 0.15 to about 0.6 parts per hundred, and most preferably from about 0.3 to about 0.6 parts per hundred.

In accordance with one preferred embodiment, the composition may further comprise, in addition to the ethylene/chlorotrifluoroethylene copolymer, phenolic complex, and phosphite, an effective stabilizing amount of a thioester. The thioester may be of the formula

R₁OOCCH₂CH₂—S—CH₂COOR₂, wherein R₁ and R₂ may be the same or different, and are selected from the group consisting of alkali metals, straight chain or branched alkyl radicals having from 1 to 36 carbon atoms, alkenyl radicals having from 6 to 36 carbon atoms, aryl radicals and alkylaryl radicals, with the proviso that not more than one of R₁ and R₂ may be hydrogen. Preferably, the thioester is distearylthiodipropionate.

The thioester, when present, may be present in an amount of from about 0.01 to about 5.0 parts per one hundred parts of ethylene/chlorotrifluoroethylene copolymer in said composition, preferably from about 0.15 to about 0.3 parts per hundred.

In accordance with another preferred embodiment, the composition may further include, in addition to the ethylene/chlorotrifluoroethylene copolymer, phenolic complex, and the phosphite, an effective stabilizing amount of a sulfide selected from the group consisting of:

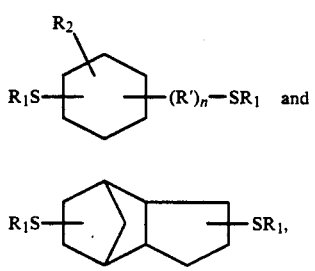

wherein R₁ is an alkyl group having from about 8 to about 20 carbon atoms, R₂ is H or an alkyl group having from 1 to about 4 carbon atoms, R' is an alkyl or alkenyl group having up to about 12 carbon atoms, and n is 0 or 1. Preferably, the sulfide is of the formula

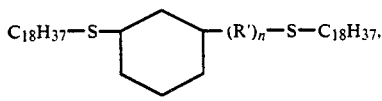

wherein R' is an alkyl or alkenyl group having up to about 12 carbon atoms, and n is 0 or 1.

A most preferred example of such a sulfite composition is 1-[B-(n-octadecylthio) ethyl]-3-(n-octadecylthio) cyclohexane, which is in the form of a white powder and has a melting point of from 56°-66° C.

The sulfide, when present, may be present in an amount of from about 0.01 to about 5.0 parts per one hundred parts of said ethylene/chlorotrifluoroethylene copolymer in said composition, preferably from about 0.15 to about 0.3 parts per hundred.

In accordance with another embodiment, the composition may comprise an ethylene/chlorotrifluoroethylene copolymer, and effective stabilizing amounts of the phenolic complex and of the thioester hereinabove described.

In accordance with yet another embodiment, the composition may comprise an ethylene/chlorotrifluoroethylene copolymer, and effective stabilizing amounts of the phenolic complex and the sulfide compound hereinabove described.

In accordance with another aspect of the present invention, there is provided a composition comprising an ethylene/chlorotrifluoroethylene copolymer and an effective stabilizing amount of (a) a phenolic complex having the formula hereinabove described and (b) an inorganic salt selected from the class consisting of tricalcium aluminate hexahydrate, or $Ca_3Al_2O_6H_2O$, and magnesium aluminum hydroxycarbonate, or $Mg_6Al_2(OH)_{.16}CO_3$.

The inorganic salt is present in an amount of from about 0.01 to about 15.0 parts per one hudnred parts of ethylene/chlorotrifluoroethylene copolymer, preferably from about 0.05 parts to about 2.0 parts per hundred, and more preferably from about 0.1 to about 0.2 part per hundred. In a preferred embodiment, the inorganic salt is tricalcium aluminate hexahydrate.

In addition to the phenolic complex and the inorganic salt, the composition may further include effective stabilizing amounts of one or more of the phosphite, thioester, or sulfide hereinabove described. Such components may also be present in the amounts hereinabove described. In a preferred embodiment, the composition comprises an ethylene/chlorotrifluoroethylene copolymer, the phenolic complex, tricalcium aluminate hexahydrate, and the phosphite.

The ethylene/chlorotrifluoroethylene copolymer may contain from about 40 mole % to about 60 mole % ethylene, and from about 40 mole % to about 60 mole % chlorotrifluoroethylene. Preferably the ethylene/chlorotrifluoroethylene copolymer contains from about 45 mole % to about 55 mole % ethylene, and from about 45 mole % to about 55 mole % chlorotrifluoroethylene, most preferably about 50 mole % ethylene and about 50 mole % chlorotrifluoroethylene.

Such ethylene/chlorotrifluoroethylene copolymers may be prepared by processes known to those skilled in the art, as described, for example in Hanford U.S. Pat. No. 2,392,378, which shows copolymerization of ethylene with chlorotrifluoroethylene in a stirred aqueous medium at superatmospheric pressure using benzoyl peroxide as catalyst; in NUCLEONICS, September, 1964, pp. 72-74, disclosing formation of a high melting (237° C.) 1:1 alternating copolymer of ethylene and chlorotrifluoroethylene prepared using radiation of 0° C.; or British Patent No. 949,422 showing bulk copolymerization of ethylene with chlorotrifluoroethylene at temperatures between −80° to +50° C. using oxygen-activated alkyl boron catalyst; or Ragazzi et al. U.S. Patent Nos. 3,371,076 and 3,501,446 respectively, relating to methods for making ethylene/chlorotrifluoroethylene copolymers using oxygen-activated boron-containing catalysts and to products obtained by that process. About equimolar ethylene/chlorotrifluoroethylene copolymers having a melting point above 200° C. can also be prepared by batchwise bulk copolymerization of the monomers at temperatures of from about 2-20 to about +20° C., at superatmospheric presusre in an agitator-equipped pressure vessel by charging the vessel with liquid chlorotrifluoroethylene monomer and bubbling gaseous ethylene into this monomer, using organic peroxide-type initiators, such as trichloracetyl peroxide and, if desired, adding small amounts of chain transfer agents, such as chloroform or heptane. The desired copolymer product is obtained as a dispersion in the monomer.

The copolymer can contain nominal amounts (up to 10 mole %) of comonomers other than ethylene and chlorotrifluoroethylene, including propylene, isobutylene, vinyl fluoride, hexafluoropropylene, hexafluoroisobutylene, tetrafluoroethylene, vinylidene fluoride, perfluoro-vinyl ether, acrylic acid and alkyl ester, methacrylic acid and alkyl ester, perfluoroalkyl ethylene, etc. Such comonomers are randomly distributed in the copolymer chain. In on eembodiment, the copolymer chain includes hexafluoroisobutylene monomer randomly distributed in the copolymer chain in an amount of up to 10 mole %.

The stabilized ethylene/chlorotrifluoroethylene copolymers of the present invention exhibit improved melt stability at elevated extrusion temperatures. Such extrusion temperatures may reach higher than 300° C. Such improved melt stability is evidenced by, for example, the absence of or the reduction in the formation of bubbles in the polymer melt, reduced change in melt index with time, and less change in color as the composition is heated. The reduced change in color indicates a decrease in or the absence of degradation of polymer chains and/or the possibility of side reactions. The reduced change in melt index indicates less breakdown and/or cross-linking of ethylene/chlorotrifluoroethylene copolymer chains.

The invention will now be described with respect to the following examples; however, the scope of the present invention is not to be limited thereby.

EXAMPLES 1-7

In the following examples, 5 lbs of ethylene/chlorotrifluoroethylene copolymer, having 50 mole %±1 mole percent ethylene and 50 mole %±1 mole % chlorotrifluoroethylene, sold by Ausimont, U.S.A., Inc. as HALAR 5041, was dry mixed in a powder mixer with various amounts of stabilizers 1, 2, 3, or 4. A control was also prepared to which no stabilizer was added to HALAR 5041. Amounts of stabilizer are measured in parts per one hundred parts of ethylene/chlorotrifluoroethylene copolymer. For purposes of the following examples, Stabilizer 1 is a 3,5-di-tert-butyl-4-hydroxy-hydrocinnamic acid triester of 1,3,5-tris(2-hydroxyethyl)-s-triazine-2,4,6-(1H, 3H, 5H)-trione sold by R. T. Vanderbilt Co. as VANOX SKT. Stabilizer 2 is tris-(2,4-di-tert-butyl-phenyl) phosphite. Stabilizer 3 is 1-(n-octadecylthio) ethyl]-3-(n-octadecylthio) cyclohexane. Stabilizer 4 is distearylthiodipropionate. The stabilizers were mixed with the copolymer in a Henschel powder mixer Model FMIOC/Purnell, Inc., Houston, Tex., for 5 minutes at room temperature to form a homogenous powder mixture. Each stabilizer and polymer mixture was then pelletized at 250°-300° C. using an extruder. Each mixture was fed to a 1½" single screw extruder with zones 1, 2, 3, and 4 set at 244° C., 264° C., 263° C., and 252° C., respectively. The resulting strands from a ⅛" round die were cooled in a water trough, air dried, and pelletized using a pelletizer. The samples were then tested for color rating (as evidenced by Black Spot Test Ranking), change in melt stability, weight loss.

Change in melt stability was determined by running a seven gram sample of a Henscheled, or powdered mixture prepared as hereinabove described on a melt index device as described in ASTM D-1238 and ASTM D-3275 at a load of 2160 grams for 30 minutes at 305° C. Change in melt index was recorded as melt stability defined as:

$$\text{Melt stability \%} = 100 \times \frac{[(\text{Original Melt Index}) - (\text{Melt Index after Heat Aging})]}{\text{Original Melt Index}}$$

The black spot ranking test is a subjective test wherein each sample tested is observed for discoloration. Optimally, the extruded sample should be of a white, or a cream color. Discoloration in most cases is in the form of various shades of brown, or black. The tested samples are ranked subjectively as to the amount of discoloration through visual observation. The sample which receives a black spot ranking of 1 shows the least discoloration, and the sample with the highest number (in these examples, 7) shows the most discoloration.

The weight loss test is performed by weighing out 5 grams of each sample in the form of a powder. Each powder sample is then heated at a temperature of 305° C. in an air circulated oven for 30 minutes. Each sample is then weighed after heating. Percent weight loss is calculated as follows:

$$\text{\% weight loss} = \frac{(\text{weight after heating}) - (\text{weight before heating})}{\text{weight before heating}} \times 100\%$$

The results are given in Table I below.

TABLE I

| Example | Stabilizer (pph) | | | | Black Spot Ranking | Melt Stability, % | Weight Loss, % |
| --- | --- | --- | --- | --- | --- | --- | --- |
| | 1 | 2 | 3 | 4 | | | |
| 1 | 0.3 | 0.3 | 0.15 | — | 1 | 6.7 | 0.28 |
| 2 | 0.6 | 0.6 | — | 0.3 | 2 | 5.4 | 0.43 |
| 3 | 0.3 | 0.3 | — | 0.15 | 3 | N/A | 0.25 |
| 4 | 0.6 | 0.6 | 0.3 | — | 4 | 3.6 | 0.48 |
| 5 | 0.15 | 0.15 | 0.075 | — | 5 | 36.4 | 0.40 |
| 6 | 0.15 | 0.15 | — | 0.075 | 6 | 75.0 | 0.40 |
| 7 | — | — | — | — | 7 | 46.1 | 2.10 |

TABLE I-continued

| Example (control) | Stabilizer (pph) | | | | Black Spot Ranking | Melt Stability, % | Weight Loss, % |
| --- | --- | --- | --- | --- | --- | --- | --- |
| | 1 | 2 | 3 | 4 | | | |

The above results indicate that at 305° C., the above stabilized ethylene/chlorotrifluoroethylene copolymer compositions show less weight loss, better melt stability, and better black spot rankings than unstabilized ethylene/chlorotrifluoroethylene copolymer. Weight losses of the stabilized compositions ranged from 0.28 to 0.43%, compared with 2.10% for unstabilized copolymer. With the exception of Example 6, (melt stability change of 75%) the melt stabilities were improved as well (3.6% to 36.4% compared with 46.1% for unstabilized copolymer).

EXAMPLES 8-11

Stabilized ethylene/chlorotrifluoroethylene copolymer compositions were prepared as disclosed in Examples 1-7, wherein Stabilizer 1 alone or with one of Stabilizers 2, 3, or 4 was added to the ethylene/chlorotrifluoroethylene copolymer. Each composition was then tested for melt stability. The results are given in Table II below.

TABLE II

| Example | Stabilizer (pph) | | | | Melt Stability, % |
| --- | --- | --- | --- | --- | --- |
| | 1 | 2 | 3 | 4 | |
| 8 | 0.3 | 0.3 | — | — | 10.5 |
| 9 | 0.3 | — | — | — | 8.7 |
| 10 | 0.3 | — | — | 0.15 | 35.4 |
| 11 | 0.3 | — | 0.15 | — | 44.9 |

EXAMPLE 12

The composition of Example 1 was scaled up for wire coating extrusion using larger sized equipment. The composition of Example 1 was mixed in a Henschel mixer at 7 lbs. per mixing and then was pelletized using a 1½" single screw extruder, equipped with an underwater pelletizer, and pelletized. The pelletized material was then evaluated on a wire line. The 1½" extrusion line was capable of coating wire at speeds of 1,100 ft./min. Extrusion conditions were as follows:

| Zone 1 temperature | 465° F. |
| --- | --- |
| Zone 2 temperature | 500° F. |
| Zone 3 temperature | 490° F. |
| Flange temperature | 510° F. |
| Crosshead temperature | 510° F. |
| Dieholder temperature | 515° F. |
| Die temperature | 551° F. |
| Screw Speed (RPM) | 16 |
| Torque (AMP) | 20 |
| Melt temperature | 546° F. |
| Diameter (in.) | 0.028 |
| Line Speed (ft./min.) | 1,079 |

The extruded wire coating composition had 1 spark failure per 20,000 feet, and had resisted tendency to form cone breaks through the run. The melt also did not emit any noticeable fumes.

EXAMPLES 13-15

The compositions of Examples 1, 4, and 5, respectively, were scaled up for high speed wire line extrusion. Each composition was mixed in a Henschel mixer and then was pelletized using a twin screw extruder. Each pelletized sample was then evaluated on a high speed wire line run at a speed of 3,000 feet per minute to coat a 24AWG copper wire with a 4.5 to 5.0 mil (0.0045" to 0.0050") coating. Each coated wire was spark tested at 2.5 kilovolts. About 400,000 feet of each coated wire was prepared. Example 13 corresponds to the composition of Example 1, Example 14 corresponds to the composition of Example 4, and Example 15 corresponds to the composition of Example 5. The extrusion conditions for each sample were as follows:

|  | Ex. 13 | Ex. 14 | Ex. 15 |
|---|---|---|---|
| Zone 1 temperature | 535° F. | 535° F. | 545° F. |
| Zone 2 temperature | 555° F. | 555° F. | 560° F. |
| Zone 3 temperature | 560° F. | 560° F. | 565° F. |
| Zone 4 temperature | 565° F. | 565° F. | 570° F. |
| Clamp temperature | 570° F. | 570° F. | 570° F. |
| Flange temperature | 575° F. | 575° F. | 575° F. |
| Groove temperature | 580° F. | 580° F. | 580° F. |
| Dieholder temperature | 595° F. | 595° F. | 595° F. |
| Extruder Screw RPM | 83 | 83 | 84 |
| Extruder Motor Amp. | 12.1 | 11.7 | 12.5 |
| Line Speed (ft./min.) | 3,003 | 3,003 | 3,003 |
| Capstan Motor Amp. | 4.55 | 4.44 | 4.44 |

The samples were tested for cone breaks, cone clarity, fumes and smoke, purge whiteness, percent weight loss, color change, odor in drum, odor during extrusion, and for spark failures.

The cone clarity evaluation is a subjective evaluation of the extruded sample for clarity of the sample. Each sample is evaluated for cone clarity on a scale of 1 to 5, with 1 indicating poor clarity and 5 indicating excellent clarity. Clarity is an indication of the evenness of the dispersion of stabilizer in the sample. Samples with excellent clarity have an even dispersion of stabilizer throughout the extruded sample.

The purge whiteness evaluation is a subjective evaluation of the degree of discoloration of material purged from the extruder. Samples are evaluated on a scale of 1 to 5, with 1 being indicative of a high degree of discoloration and 5 being indicative of little or no discoloration. Samples showing little or no discoloration are samples in which little or no degradation of the polymer has occurred.

The color change evaluation is similar to the purge whitenss evaluation. The extruded samples are evaluated on a scale of 1 to 5, with 1 indicating much color change in the extruded product as compared with the sample before extrusion, while 5 indicates little or no color change. Those samples showing little or no color change have experienced little or no polymer degradation.

The amount of fumes and smoke is also evaluated subjectively on a scale of 1 to 5, with 1 indicating a high amount of fumes and smoke emitted as a result of melt extrusion of the polymer, while 5 is indicative of little or no fumes or smoke being emitted.

Odor in the drum and during extrusion is also evaluated on a scale of 1 to 5, with 1 being indicative of a strong odor and 5 being indicative of little or no odor. The results of each test for each sample are listed in Table III below.

TABLE III

|  | Ex. 13 | Ex. 14 | Ex. 15 |
|---|---|---|---|
| Average Spark Failure | 1/22,000 | 1/67,000 | 1/43,000 |

TABLE III-continued

|  | Ex. 13 | Ex. 14 | Ex. 15 |
|---|---|---|---|
| Footage |  |  |  |
| Cone Breaks | 0 | 0 | 0 |
| Cone Clarity | 5 | 5 | 5 |
| Fume/smoke | 4 | 3 | 5 |
| Purge Whiteness | 5 | 5 | 5 |
| Weight Loss | 0.187 | 0.254 | 0.120 |
| Color Change | 4 | 5 | 5 |
| Odor in Drum | 4 | 4 | 4 |
| Odor During Extrusion | 4 | 3 | 5 |

EXAMPLES 16-20

In these examples, 5 lbs. of ethylene/chlorotrifluoroethylene copolymer, having 50 mole %±1 mole % ethylene and 50 mole %±1 mole % chlorotrifluoroethylene, sold by Ausimont, U.S.A., Inc. as HALAR 5041, was dry mixed in a powder mixer with various amounts of stabilizers 1, 2, 4, 5, or 6. Amounts of stabilizer were measured in parts per one hundred parts of ethylene/chlorotrifluoroethylene copolymer. Stabilizers 1, 2, and 4 are as hereinbove described. Stabilizer 5 is tricalcium aluminate hexahydrate, or $Ca_3Al_2O_6 \cdot 6H_2O$, sold by J. M. Huber Corporation, Havre de Grace, Md., as Hysafe 310. Stabilizer 6 is a combination of a phosphite of an organic polyhydric phenol and zinc -2-ethyl-hexylate, sold by Argus Corporation as Mark 158.

The stabilizers were mixed with the copolymer in a Henschel powder mixer, extruded, cooled, air dried, and pelletized according to the procedure as hereinabove described for Examples 1-7.

The samples were then tested for melt stability and color stability. Melt stability was tested according to ASTM D-1238 and ASTM D-3275 as hereinabove described except that change in melt stability was measured at 290° C.

Color stability is measured according to the extent of discoloration by visual observation. Color stability is rated from 0 (best) to 5 (worst) in increments of 0.5.

The melt stability and color stability results are given in Table III below.

TABLE III

| Example | Stabilizer (pph) | | | | | Melt Stability, % | Color Stability |
|---|---|---|---|---|---|---|---|
|  | 1 | 2 | 4 | 5 | 6 |  |  |
| 16 | 0.3 | 0.3 | — | — | — | 8.0 | 1.0 |
| 17 | — | — | 0.15 | — | 0.3 | 1.0 | 2.5 |
| 18 | 0.3 | 0.3 | — | 0.1 | — | 7.0 | 0.5 |
| 19 | 0.3 | 0.3 | — | 0.2 | — | 7.0 | 1.0 |
| 20 | 0.6 | 0.6 | 0.3 | 0.2 | — | 0.0 | 1.5 |

Advantages of the present invention include the formation of improved stabilized halopolymer compositions which may be extruded at high temperatures (e.g., 300° C. and above), which exhibit low volatility and little change in melt stability. Such compositions also exhibit low weight loss after extrusion and have good color ratings. In addition, such compositions give off less fumes upon extrusion and have a minimal number of spark failures and cone breaks.

It is to be understood, however, that the scope of the present invention is not to be limited to the specific embodiments described above. The invention may be practiced other than as particularly described and still be within the scope of the accompanying claims.

What is claimed is:

1. A composition, comprising:
   an ethylene/chlorotrifluoroethylene copolymer; and
   an effective stabilizing amount of (a) a phenolic complex having the formula:

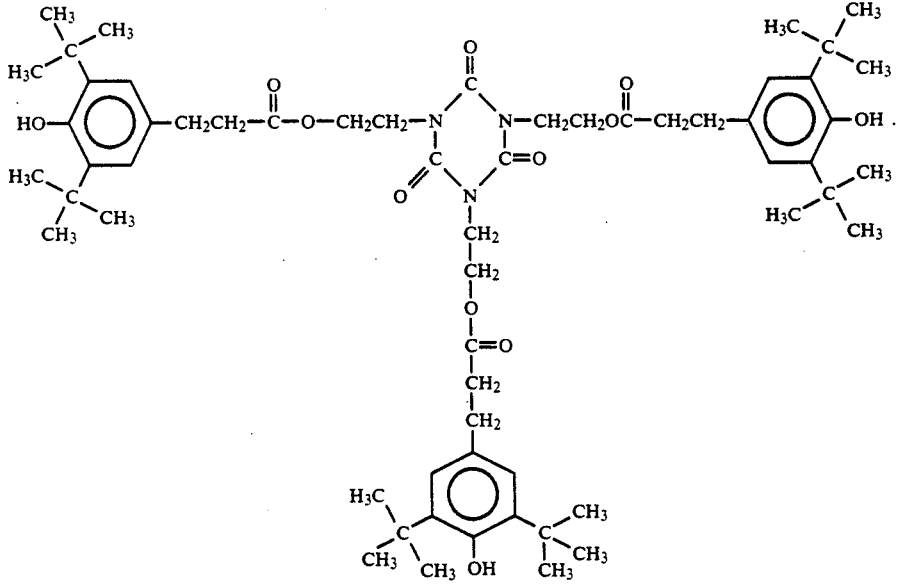

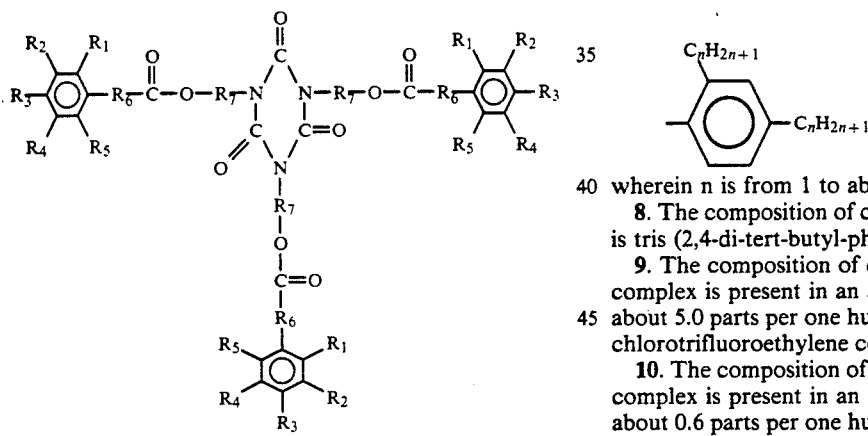

wherein at least one of $R_1$, $R_2$, $R_3$, $R_4$ and $R_5$ is —OH, and wherein the remaining $R_1$ through $R_5$ is hydrogen or an aliphatic hydrocarbon, and wherein each of $R_1$ through $R_5$ may be the same or different provided that at least one of $R_1$ through $R_5$ is —OH, and each of $R_6$ and $R_7$ is an alkylene group having from 1 to about 10 carbon atoms, and each of $R_6$ and $R_7$ may be the same or different; and
   (b) a phosphite of the formula P-(OR)$_3$, wherein R is hydrogen, or an alkyl, cycloalkyl, aralkyl, aryl, or a hydroxy-substituted alkyl group having from 1 to 18 carbon atoms.

2. The composition of claim 1 wherein said aliphatic hydrocarbon is a saturated hydrocarbon.

3. The composition of claim 2 wherein said saturated hydrocarbon has from 1 to 5 carbon atoms.

4. The composition of claim 3 wherein at least one of said remaining $R_1$ through $R_5$ is a tert-butyl group.

5. The composition of claim 4 wherein each of $R_6$ and $R_7$ is an alkylene group having from 1 to 5 carbon atoms.

6. The composition of claim 5 wherein said phenolic complex has the formula:

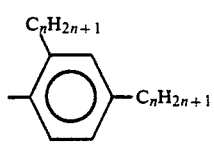

7. The composition of claim 1 wherein said phosphite is of the formula P-(OR)$_3$, wherein R is of the formula:

wherein n is from 1 to about 9.

8. The composition of claim 7 wherein said phosphite is tris (2,4-di-tert-butyl-phenyl) phopshite.

9. The composition of claim 1 wherein said phenolic complex is present in an amount of from about 0.02 to about 5.0 parts per one hundred parts of said ethylene/chlorotrifluoroethylene copolymer in said composition.

10. The composition of claim 9 wherein said phenolic complex is present in an amount of from about 0.15 to about 0.6 parts per one hundred parts of said ethylene/chlorotrifluoroethylene copolymer in said composition.

11. The composition of claim 10 wherein said phenolic complex is present in an amount of from about 0.3 to about 0.6 parts per one hundred parts of said ethylene/chlorotrifluoroethylene copolymer in said composition.

12. The composition of claim 1 wherein said phosphite is present in an amount of from about 0.02 to about 5.0 parts per one hundred parts of said ethylene/chlorotrifluoroethylene copolymer in said composition.

13. The composition of claim 12 wherein said phosphite is present in an amount of from about 0.15 to about 0.6 parts per one hundred parts of said ethylene/chlorotrifluoroethylene copolymer in said composition.

14. The composition of claim 13 wherein said phosphite is present in an amount of from about 0.3 to about 0.6 parts per one hundred parts of said ethylene/chlorotrifluoroethylene copolymer in said composition.

15. The composition of claim 1, and further comprising an effective stabilizing amount of a thioester.

16. The composition of claim 15 wherein said thioester is of the formula:

R₁OOCCH₂CH₂-S-CH₂CH₂COOR₂, wherein $R_1$ and $R_2$ may be the same or different, and are selected from the group consisting of hydrogen, alkali metals, straight chain or branched chain alkyl radicals having from 1 to 36 carbon atoms, alkenyl radicals having from 6 to 36 carbon atoms, aryl radicals and alkylaryl radicals, with the proviso that not more than one of $R_1$ and $R_2$ may be hydrogen.

17. The composition of claim 16 wherein said thioester is distearyl-thiodipropionate.

18. The composition of claim 15 wherein said thioester is present in an amount of from about 0.01 to about 5.0 parts per one hundred parts of said ethylene/chlorotrifluoroethylene copolymer in said composition.

19. The composition of claim 18 wherein said thioester is present in an amount of from about 0.15 to about 0.3 parts per one hundred parts of said ethylene/chlorotrifluoroethylene copolymer in said composition.

20. The compound of claim 1, and further comprising an effective stabilizing amount of a sulfide selected from the group consisting of:

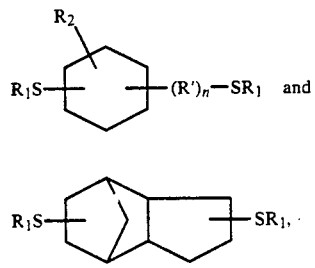

wherein $R_1$ is an alkyl group having from about 8 to about 20 carbon atoms, $R_2$ is H or an alkyl group having from 1 to about 4 carbon atoms, R' is an alkyl or alkyenyl group having up to about 12 carbon atoms, and n is 0 or 1.

21. The Composition of claim 20 wherein said sulfide is the formula:

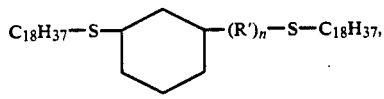

wherein- R' is an alkyl or alkenyl group having up to about 12 carbon atoms, and n is 0 or 1.

22. The composition of claim 20 wherein said sulfide is present in an amount of from about 0.01 to about 5.0 parts per one hundred parts of said ethylene/chlorotrifluoroethylene copolymer in said composition.

23. The composition of claim 22 wherein said sulfide is present in an amount of from about 0.15 to about 0.3 parts per one hundred parts of said ethylene/chlorotrifluoroethylene copolymer in said composition.

24. The composition of claim 1 wherein said ethylene is present in an amount of from about 40 mole % to about 60 mole % of said ethylene/chlorotrifluoroethylene copolymer, and said chlorotrifluoroethylene is present in an amount of from about 40 mole % to about 60 mole % of said ethylene/chlorotrifluoroethylene copolymer.

25. The composition of claim 24 wherein said ethylene is present in an amount of from about 45 mole % to about 55 mole % of said ethylene/chlorotrifluoroethylene copolymer, and said chlorotrifluoroethylene is present in an amount of from about 45 mole % to about 55 mole % of said ethylene/chlorotrifluoroethylene copolymer.

26. The composition of claim 25 wherein said ethylene is present in an amount of from about 50 mole % of said ethylene/chlorotrifluoroethylene copolymer, and said chlorotrifluoroethylene is present in an amount of about 50 mole % of said ethylene/chlorotrifluoroethylene copolymer.

27. A composition comprising:
an ethylene/chlorotrifluoroethylene copolymer; and
an effective stabilizing amount of (a) a phenolic complex having the formula

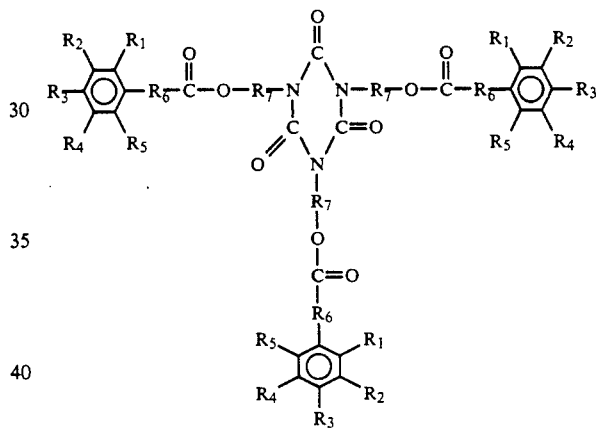

wherein at least one $R_1$, $R_2$, $R_3$, $R_4$, and $R_5$ is —OH, and wherein the remaining $R_1$ through $R_5$ is hydrogen or an aliphatic hydrocarbon, and wherein each of $R_1$ through $R_5$ may be the same or different provided that at least one of $R_1$ through $R_5$ is —OH, and each of $R_6$ and $R_7$ is an alkylene group having from 1 to about 10 carbon atoms, and each of $R_6$ and $R_7$ may be the same or different; and (b) an inorganic salt selected from the group consisting of tricalcium aluminate hexahydrate and magnesium aluminum hydroxy carbonate.

28. The composition of claim 27 wherein said aliphatic hydrocarbon is a saturated hydrocarbon.

29. The composition of claim 28 wherein said saturated hydrocarbon has from 1 to 5 carbon atoms.

30. The composition of claim 29 wherein at least one of said remaining $R_1$ through $R_5$ is a tert-butyl group.

31. The composition of claim 30 wherein each of $R_6$ and $R_7$ is an alkylene group having from 1 to 5 carbon atoms.

32. The composition of claim 31 wherein said phenolic complex has the formula

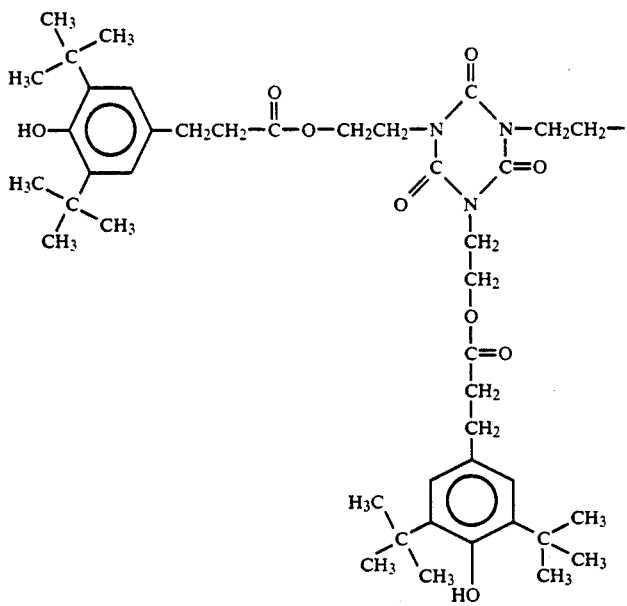

33. The composition of claim 27, and further comprising an effective stabilizing amount of a phosphite of the formula P-(OR)$_3$, wherein R is hydrogen or an alkyl, cycloalkyl, aralkyl, aryl, or a hydroxy-substituted alkyl group having from 1 to about 18 carbon atoms.

34. The composition of claim 33 wherein said phosphite is of the formula P-(OR)$_3$, wherein R is of this formula:

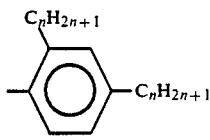

wherein n is from 1 to about 9.

35. The composition of claim 34 wherein said phosphite is tris (2,4-di-tert-butyl-phenyl) phopshite.

36. The composition of claim 27 wherein said phenolic complex is present in an amount of from about 0.02 to about 5.0 parts per one hundred parts of ethylene/chlorotrifluoroethylene copolymer in said composition.

37. The composition of claim 36 wherein said phenolic complex is present in an amount of from about 0.15 to about 0.6 parts per one hundred parts of said ethylene/chlorotrifluoroethylene copolymer in said composition.

38. The composition of claim 37 wherein said phenolic complex is present in an amount of from about 0.3 to about 0.6 parts per one hundred parts of said ethylene/chlorotrifluoroethylene copolymer in said composition.

39. The composition of claim 27 wherein said inorganic salt is tricalcium aluminate hexahydrate.

40. The composition of claim 39 wherein said tricalcium aluminate hexahydrate is present in an amount of from about 0.01 to about 15.0 parts per one hundred parts of said ethylene/chlorotrifluoroethylene copolymer in said composition.

41. The composition of claim 40 wherein said tricalcium aluminate hexahydrate is present in an amount of from about 0.05 to about 2.0 parts per one hundred parts of ethylene/chlorotrifluoroethylene copolymer copolymer in said composition.

42. The composition of claim 41 wherein said tricalcium aluminate hexahydrate is present in an amount of from about 0.1 to about 0.2 part per one hundred parts of ethylene/chlorotrifluoroethylene copolymer in said composition.

43. The composition of claim 33 wherein said phosphite is present in an amount of from about 0.02 to about 5.0 parts per one hundred parts of said ethylene/chlorotrifluoroethylene copolymer in said composition.

44. The composition of claim 43 wherein said phosphite is present in an amount of from about 0.15 to about 0.6 parts per one hundred parts of said ethylene/chlorotrifluoroethylene copolymer in said composition.

45. The composition of claim 44 wherein said phosphite is present in an amount of from about 0.3 to about 0.6 parts per one hundred parts of said ethylene/chlorotrifluoroethylene copolymer in said composition.

46. The composition of claim 27, and further comprising an effective stabilizing amount of a thioester.

47. The composition of claim 46 wherein said thioester is of the formula:

R$_1$OOCCH$_2$CH$_2$-S-CH$_2$CH$_2$COOR$_2$, wherein R$_1$ and R$_2$ may be the same or different, and are selected from the group consisting of hydrogen, alkali metals, straight chain or branched chain alkyl radicals having from 1 to 36 carbon atoms, alkenyl radicals having from 6 to 36 carbon atoms, aryl radicals and alkylaryl radicals, with the proviso that not more than one of R$_1$ and R$_2$ may be hydrogen.

48. The composition of claim 46 wherein said thioester is distearyl-thiodipropionate.

49. The composition of claim 46 wherein said thioester is present in an amount of from about 0.01 to about 5.0 parts per one hundred parts of said ethylene/chlorotrifluoroethylene copolymer in said composition.

50. The composition of claim 49 wherein said thioester is present in an amount of from about 0.15 to about 0.3 parts per one hundred parts of said ethylene/chlorotrifluoroethylene copolymer in said composition.

51. The compound of claim 27, and further comprising an effective stabilizing amount of a sulfide selected from the group consisting of:

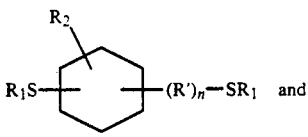

and

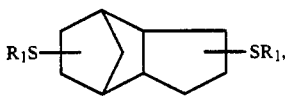

wherein $R_1$ is an alkyl group having from about 8 to about 20 carbon atoms, $R_2$ is H or an alkyl group having from 1 to about 4 carbon atoms, $R'$ is an alkyl or alkyenyl group having up to about 12 carbon atoms, and n is 0 or 1.

52. The Composition of claim 51 wherein said sulfide is the formula:

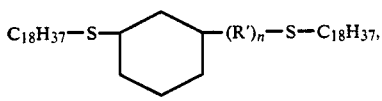

wherein $R'$ is an alkyl or alkenyl group up to about 12 carbon atoms, and n is 0 or 1.

53. The composition of claim 51 wherein said sulfide is present in an amount of from about 0.01 to about 5.0 parts per one hundred parts of said ethylene/chlorotrifluoroethylene copolymer in said composition.

54. The composition of claim 53 wherein said sulfide is present in an amount of from about 0.15 to about 0.3 parts per one hundred parts of said ethylene/chlorotrifluoroethylene copolymer in said composition.

55. The composition of claim 27 wherein said ethylene is present in an amount of from about 40 mole % to about 60 mole % of said ethylene/chlorotrifluoroethylene copolymer, and said chlorotrifluoroethylene is present in an amount of from about 40 mole % to about 60 mole % of said ethylene/chlorotrifluoroethylene copolymer.

56. The composition of claim 55 wherein said ethylene is present in an amount of from about 45 mole % to about 55 mole % of said ethylene/chlorotrifluoroethylene copolymer, and said chlorotrifluoroethylene is present in an amount of from about 45 mole % to about 55 mole % of said ethylene/chlorotrifluoroethylene copolymer.

57. The composition of claim 56 wherein said ethylene is present in an amount of from about 50 mole % of said ethylene/chlorotrifluoroethylene copolymer, and said chlorotrifluoroethylene is present in an amount of about 50 mole % of said ethylene/chlorotrifluoroethylene copolymer.

58. The composition of claim 1 wherein said ethylene/chlorotrifluoroethylene copolymer further includes hexafluroisobutylene monomer units randomly distributed throughout said ethylene/chlorotrifluoroethylene copolymer in an amount up to 10 mole % of said ethylene/chlorotrifluoroethylene copolymer.

59. The compositon of claim 27 wherein said ethylene/chlorotrifluoroethylene copolymer further includes hexafluoroisobutylene monomer units randomly distributed throughout said ethylene/chlorotrifluoroethylene copolymer in an amount up to 10 mole % of said ethylene/chlorotrifluoroethylene copolymer.

* * * * *